(12) United States Patent
Jo et al.

(10) Patent No.: US 11,307,698 B2
(45) Date of Patent: Apr. 19, 2022

(54) TOUCH DISPLAY DEVICE, DRIVING CIRCUIT AND DRIVING METHOD THEREOF

(71) Applicant: LG Display Co., Ltd., Seoul (KR)

(72) Inventors: Youngwoo Jo, Paju-si (KR); HyeongWon Kang, Seoul (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 17/116,530

(22) Filed: Dec. 9, 2020

(65) Prior Publication Data

US 2021/0191555 A1    Jun. 24, 2021

(30) Foreign Application Priority Data

Dec. 24, 2019  (KR) .................. 10-2019-0173903

(51) Int. Cl.
   *G06F 3/041*    (2006.01)
   *G06F 3/044*    (2006.01)
   *G09G 3/36*     (2006.01)

(52) U.S. Cl.
   CPC ............ *G06F 3/0412* (2013.01); *G06F 3/044* (2013.01); *G09G 3/3648* (2013.01); *G09G 3/3674* (2013.01); *G09G 3/3685* (2013.01); *G09G 2310/0291* (2013.01); *G09G 2310/0297* (2013.01); *G09G 2310/08* (2013.01)

(58) Field of Classification Search
   CPC .... G06F 1/3262; G06F 3/0412; G06F 3/0416; G06F 3/04184; G06F 3/044; G06F 3/0443; G09G 2310/0291; G09G 2310/0297; G09G 2310/08; G09G 2330/021; G09G 2370/08; G09G 3/3648; G09G 3/3674; G09G 3/3685
   See application file for complete search history.

(56) References Cited

U.S. PATENT DOCUMENTS

| | | | |
|---|---|---|---|
| 2010/0171737 A1* | 7/2010 | Bae ..................... | G09G 3/3648 345/213 |
| 2014/0176489 A1* | 6/2014 | Park .................... | G06F 3/04182 345/174 |
| 2018/0059832 A1* | 3/2018 | Cho ..................... | G09G 3/3648 |
| 2018/0082653 A1* | 3/2018 | Wang .................. | G09G 3/3648 |
| 2018/0107373 A1* | 4/2018 | Cheng ............... | G06F 3/041661 |
| 2019/0121468 A1* | 4/2019 | Jun ....................... | G06F 3/0443 |
| 2019/0155432 A1* | 5/2019 | Park .................... | G09G 3/2096 |
| 2019/0196644 A1* | 6/2019 | Chung ................ | G06F 3/04182 |

* cited by examiner

*Primary Examiner* — Hong Zhou
(74) *Attorney, Agent, or Firm* — Fenwick & West LLP

(57) ABSTRACT

Embodiments of the present disclosure relate to touch display devices, driving circuits, and driving methods, and more specifically, to a touch display device, a driving circuit, and a driving method for enabling the functionality of a micro control unit to be minimized and power consumption to be reduced by allowing one or more combined integrated circuits to generate a touch sensing control signal and provide the generated signal to a plurality of combined integrated circuits. Further, according to embodiments of the present disclosure, touch display devices, driving circuits, and driving methods are provided for enabling power consumption of a touch power integrated circuit to be reduced by using a touch sensing control signal generated by one or more combined integrated circuits as a load-free driving signal.

25 Claims, 7 Drawing Sheets

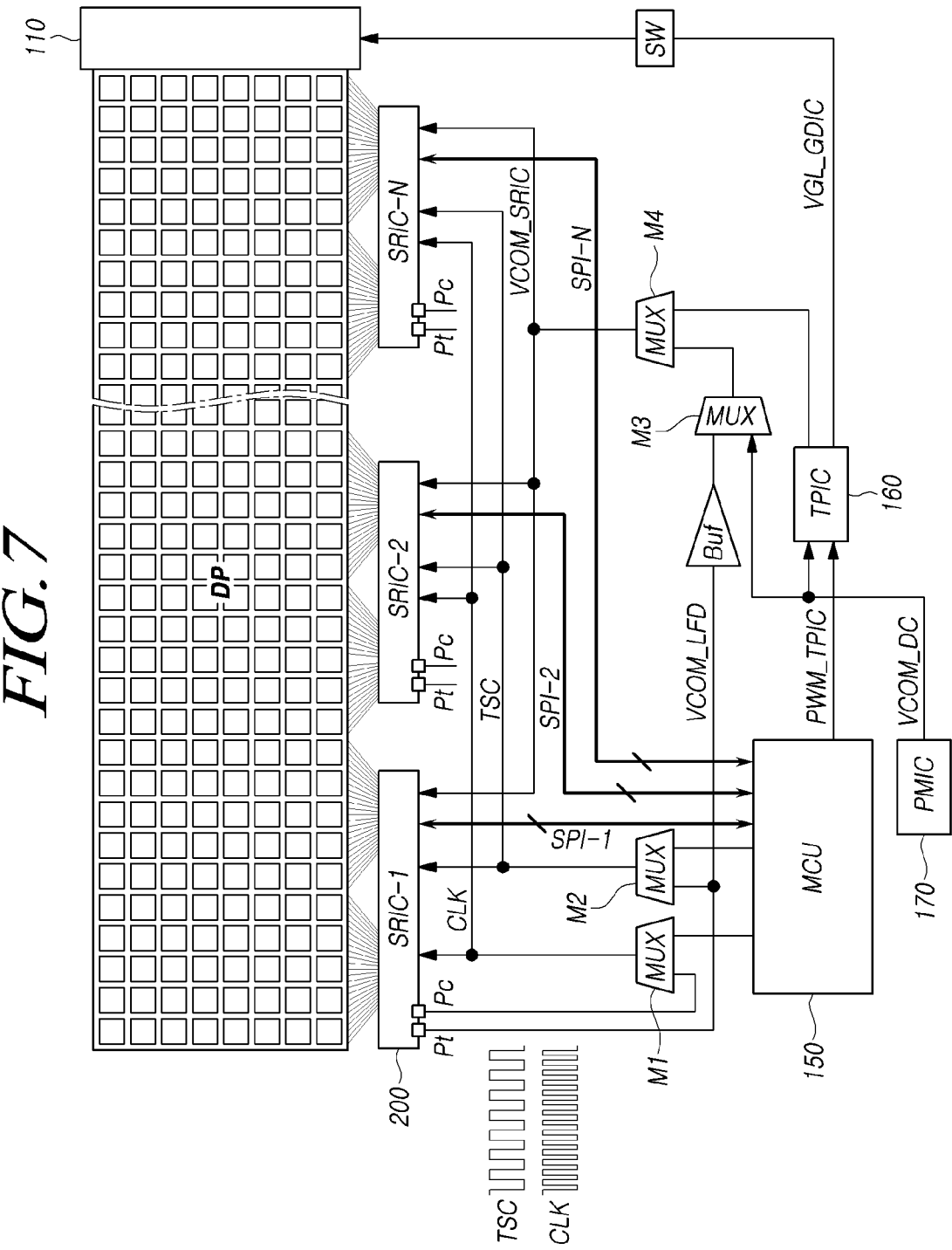

TOUCH DISPLAY DEVICE, DRIVING CIRCUIT AND DRIVING METHOD THEREOF

CROSS-REFERENCE TO RELATED APPLICATION

This application claims the priority benefit of Republic of Korea Patent Application No. 10-2019-0173903, filed on Dec. 24, 2019 in the Korean Intellectual Property Office, the disclosure of which is incorporated herein by reference in its entirety.

BACKGROUND

1. Technical Field

The present disclosure relates to touch display devices, driving circuits, and driving methods.

2. Description of the Related Art

With the development of multimedia, demand for display devices has continued to increase. To meet such demand, flat-panel display devices, such as a liquid crystal display (LCD) device, a plasma display panel (PDP), and an organic light emitting display device, or the like, have been developed and utilized.

Among such flat-panel display devices, the liquid crystal display device is widely used as a portable flat panel display device due to its excellent image quality, light weight, thinness, and low power consumption. In particular, the flat-panel display devices are employed in a variety of electronics devices, such as laptops, computer monitors, televisions, or the like.

Recently, a touch panel has been mounted on, or integrated in, the liquid crystal display device, and in turn, such an liquid crystal display device with the touch panel, sometimes called a touch display device, has been widely used to produce information corresponding to, or perform calculations associated with, a touch point which a conductive object, such as a finger, a stylus pen, or the like, contacts by detecting a change in an electrical property such as resistance or capacitance at the touch point. Such a touch display device is increasingly used to provide user interfaces for electronic devices or telecommunication devices, such as portable terminals, office equipment, mobile devices, and the like.

However, the mounting of a separate touch panel on the touch display device leads the display device to be thick, and in turn, this implementation may limit a thin display device and have a disadvantage of allowing transmission efficiency of light to decrease while passing through the stacked touch panel, and production cost to increase. To address these issues, recently, an advanced in-cell touch (AIT) type of display device in which a touch electrode is embedded inside of a pixel area of a display panel has been proposed.

A touch driving circuit of such a touch display device includes a plurality of combined integrated circuits which is connected to a display panel, and determines presence or absence of a touch based on a touch sensing control signal from a micro control unit located in the outside.

Like this, when the touch driving circuit determines the presence or absence of a touch based on a touch sensing signal provided from the external micro control unit, the micro control unit is needed to provide a touch sensing control signal to the combined integrated circuit SRIC to determine the presence or absence of a touch even when the touch display device is operated in a low power mode; therefore, there occurs a problem of allowing power consumption to increase in the low power mode.

SUMMARY

In accordance with embodiments of the present disclosure, touch display devices, driving circuits, and driving methods are provided for enabling the functionality of a micro control unit to be minimized and power consumption to be reduced by allowing one or more combined integrated circuits to generate a touch sensing control signal and provide the generated signal to other combined integrated circuits.

Further, in accordance with embodiments of the present disclosure, touch display devices, driving circuits, and driving methods are provided for enabling power consumption of a touch power integrated circuit to be reduced by using a touch sensing control signal generated by one or more combined integrated circuits as a load-free driving signal.

In accordance with one aspect of the present disclosure, a touch display device is provided that comprises: a display panel including a plurality of touch electrodes, a gate driving circuit providing gate signals to a plurality of gate lines, a data driving circuit providing data voltages to a plurality of data lines, and a touch driving circuit including at least one master combined integrated circuit which is selected from a plurality of combined integrated circuits providing at least one touch driving signal to the display panel and sensing a touch based on at least one touch sensing signal received in response to the at least one touch driving signal, and which provides a clock signal and a touch sensing control signal to the plurality of combined integrated circuits.

In the touch display device, the plurality of combined integrated circuits each may include a clock signal output pin and a touch sensing control signal output pin, and the touch sensing control signal may include a touch synchronization signal or a touch driving signal.

The touch display device may further include a micro control unit providing a clock signal and a touch sensing control signal to the plurality of combined integrated circuits, and a multiplexer selecting, according to an operation mode, a clock signal and a touch sensing control signal to be provided to the plurality of combined integrated circuits, supplied from one of the master combined integrated circuit and the micro control unit.

In the touch display device, when being in a normal mode, the multiplexer may select, from the micro control unit, the clock signal and the touch sensing control signal to be provided to the plurality of combined integrated circuits, and when being in a low power mode, select, from the master combined integrated circuit, the clock signal and the touch sensing control signal to be provided to the plurality of combined integrated circuits.

In the touch display device, the master combined integrated circuit of the plurality of combined integrated circuits may be disposed at a location closest to the micro control unit.

In the touch display device, the master combined integrated circuit may include an oscillator generating a pulse signal of a certain frequency, a touch signal generator generating a clock signal and a touch sensing control signal using the pulse signal, a touch detector sensing a touch based on at least one touch sensing signal provided from the display panel, an interface controller for outputting a result from the touch sensing, and a driving controller for controlling touch sensing operations of the touch detector and the interface controller according to the clock signal and the touch sensing control signal.

In the touch display device, the touch detector can determine the presence or absence of a touch by comparing touch sensing signals received during a certain time period, comparing an average value of the touch sensing signals received during the certain time period with each touch sensing signal, or comparing at least one touch sensing signal with a reference value stored in a memory.

The touch display device may further include a touch power integrated circuit for generating an AC signal applied to a plurality of touch electrodes through the plurality of combined integrated circuits during a touch sensing period, and a multiplexer for selecting, according to an operation mode, one of the touch sensing control signal generated from the master combined integrated circuit and the AC signal generated from the touch power integrated circuit, and providing the selected signal to the plurality of combined integrated circuits.

The touch display device may further include one or more buffers disposed between the master combined integrated circuit and the multiplexer.

The touch display device may further include a switch disposed between the touch power integrated circuit and the gate driving circuit, and controlling a gate low voltage applied to the gate driving circuit according to an operation mode.

In accordance with another aspect of the present disclosure, a driving circuit of a touch display device is provided that comprises a gate driving circuit providing gate signals to a display panel including a plurality of touch electrodes, a data driving circuit providing data voltages, and a touch driving circuit including a plurality of combined integrated circuits for providing at least one touch driving signal to the display panel and sensing a touch based on at least one touch sensing signal received in response to the at least one touch driving signal, the driving circuit comprising: at least one master combined integrated circuit which is selected from the plurality of combined integrated circuits and which includes an oscillator generating a pulse signal of a certain frequency, a touch signal generator generating a clock signal and a touch sensing control signal using the pulse signal, a touch detector sensing a touch based on the at least one touch sensing signal provided from the display panel, an interface controller for outputting a result from the touch sensing, and a driving controller for controlling touch sensing operations of the touch detector and the interface controller according to the clock signal and the touch sensing control signal.

In accordance with further another aspect of the present disclosure, a method is provided for driving a touch display device comprising a gate driving circuit providing gate signals to a display panel including a plurality of touch electrodes, a data driving circuit providing data voltages, and a touch driving circuit including a plurality of combined integrated circuits for providing at least one touch driving signal to the display panel and sensing a touch based on at least one touch sensing signal received in response to the at least one touch driving signal, the method comprising: generating a clock signal and a touch sensing control signal by at least one master combined integrated circuit selected from the plurality of combined integrated circuits, generating a clock signal and a touch sensing control signal by a micro control unit, and providing, according to an operation mode, one of the clock signal and the touch sensing control signal generated from the master combined integrated circuit and the clock signal and the touch sensing control signal generated from the micro control unit to the plurality of combined integrated circuits.

The method of driving the touch display device may further include selecting, from the micro control unit, a clock signal and a touch sensing control signal to be provided to the plurality of combined integrated circuits when the operation mode is a normal mode, and selecting, from the master combined integrated circuit, the clock signal and the touch sensing control signal to be provided to the plurality of combined integrated circuits when the operation mode is the low power mode.

The method of driving the touch display device may further include generating an AC signal applied to a plurality of touch electrodes through the plurality of combined integrated circuits by a touch power integrated circuit during a touch sensing period, and selecting, according to an operation mode, one of the touch sensing control signal generated from the master combined integrated circuit and the AC signal generated from the touch power integrated circuit, and providing the selected signal to the plurality of touch electrodes.

The method of driving the touch display device may further include controlling a gate low voltage applied to the gate driving circuit according to an operation mode through a switch disposed between the touch power integrated circuit and the gate driving circuit.

In accordance with embodiments of the present disclosure, it is possible to provide touch display devices, driving circuits, and driving methods for enabling the functionality of a micro control unit to be minimized and power consumption to be reduced by allowing one or more combined integrated circuits to generate a touch sensing control signal and provide the generated signal to the plurality of combined integrated circuits.

Further, in accordance with embodiments of the present disclosure, it is possible to provide touch display devices, driving circuits, and driving methods for enabling power consumption of a touch power integrated circuit to be reduced by using a touch sensing control signal generated by one or more combined integrated circuits as a load-free driving signal.

BRIEF DESCRIPTION OF THE DRAWINGS

FIG. 7 illustrates a configuration of a touch display device according to another embodiment of the present disclosure.

DETAILED DESCRIPTION

Figure 1:
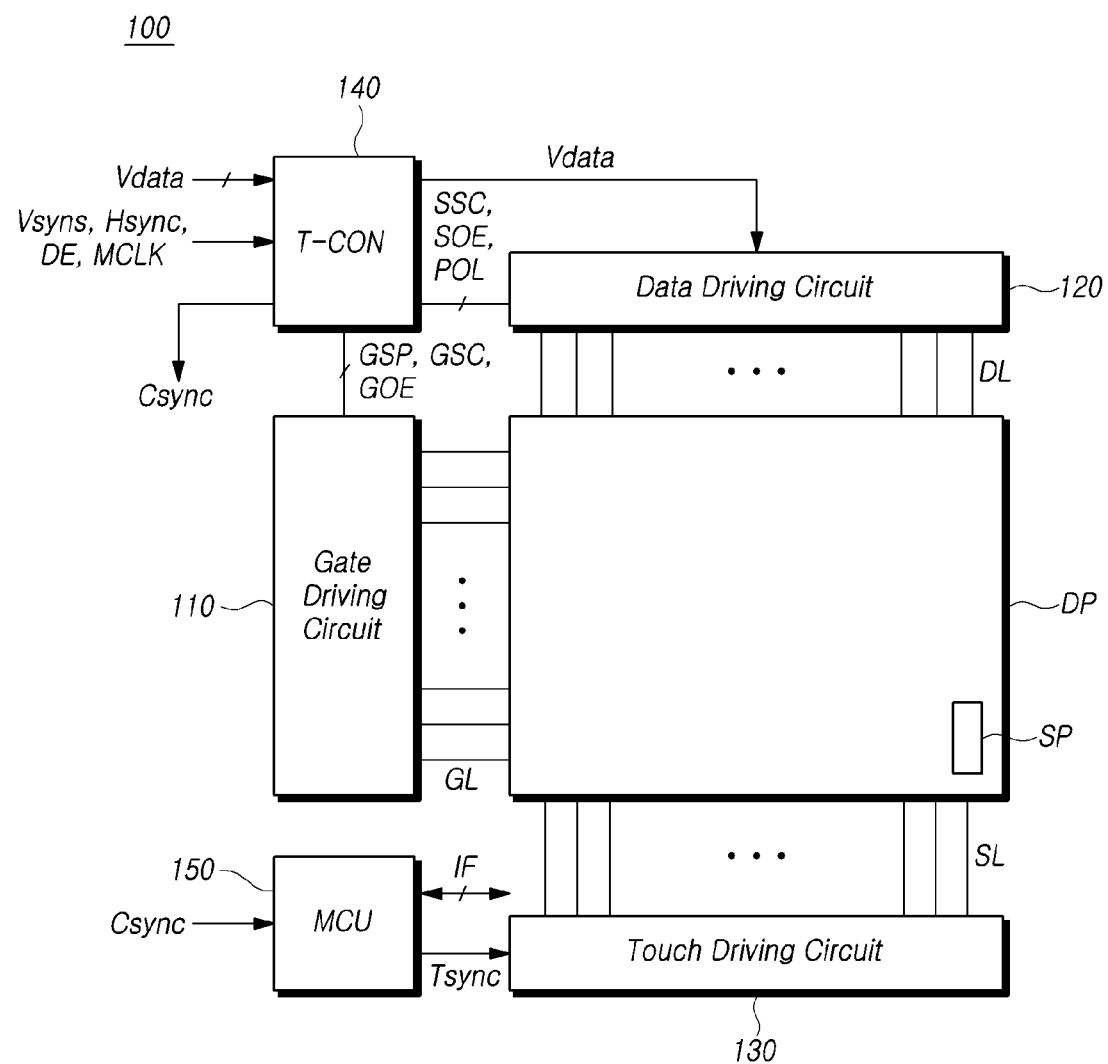
FIG. 1 illustrates a block diagram of a touch display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompass all the meanings of the term "can".

FIG. 1 is a block diagram illustrating a touch display device according to embodiments of the present disclosure.

Referring to FIG. 1, the touch display device 100 according to embodiments of the present disclosure may include a display panel DP, a gate driving circuit 110, a data driving circuit 120, a touch driving circuit 130, a timing controller (T-CON) 140, and a micro control unit (MCU) 150.

The display panel DP can display images based on gate signals provided from the gate driving circuit 110 through the gate lines GL and data voltages provided from the data driving circuit 120 through the data lines DL.

The display panel DP may include a liquid crystal layer interposed between two sheets, and be operated in any of a twisted nematic (TN) mode, a vertical alignment (VA) mode, an in-plane switching (IPS) mode, a fringe field switching (FFS) mode, and the like.

A plurality of sub-pixels SP included in the display panel DP may be defined by a plurality of data lines and a plurality of gate lines. One sub-pixel SP may include a thin film transistor (TFT) formed in an area in which one data line DL and one gate line GL intersect each other, an light emitting element, such as an organic light emitting diode, to which data voltages Vdata are loaded, a storage capacitor Cst electrically connected to the organic light emitting diode and maintaining a voltage on a certain level, and the like.

A black matrix, a color filter, and the like may be arranged on an upper substrate of the display panel DP, and a thin film transistor (TFT), a sub-pixel SP, a common electrode, and the like may be arranged on a lower substrate of the display panel DP. The display panel DP may be implemented in a Color filter On TFT (COT) structure, and in this case, the black matrix and the color filter may be arranged on the lower substrate of the display panel DP.

The common electrode to which a common voltage is applied may be formed on the upper or lower substrate of the display panel DP. Polarizing plates may be mounted on the respective upper and lower substrates of the display panel DP, and an alignment layer for setting a tilt angle of the liquid may be formed on an inner surface thereof which contacts a liquid crystal.

A column spacer for maintaining a cell gap of a liquid crystal cell may be formed between the upper and lower substrates of the display panel DP. A backlight unit may be disposed under a rear surface of the lower polarizing plate of the display panel DP. The backlight unit may be implemented in an edge type or in a direct type etc. and causes the display panel DP to emit light.

At this time, a touch screen panel may be embedded in an in-cell touch type in a pixel array portion of the display panel DP. The touch screen panel of the in-cell touch type may use, as one or more touch electrodes, electrodes arranged in a block shape by electrodes or the like formed inside of the display panel DP.

The timing controller 140 can control the gate driving circuit 110 and the data driving circuit 120. The timing controller 140 can receive data voltages Vdata corresponding to image signals, and timing signals, such as a vertical synchronous signal Vsync, a horizontal synchronous signal Hsync, a data enable signal DE, a main clock signal MCLK, and the like, from the outside (e.g., a host system).

The timing controller 140 can control operations of the gate driving circuit 110 based on at least one scan timing control signal, such as a gate start pulse GSP, a gate shift clock, a gate output enable signal GOE, and the like. Further, the timing controller 140 can control operations of the data driving circuit 120 based on at least one data timing control signal, such as a source sampling clock SSC, a polarity control signal POL, a source output enable signal SOE, or the like.

The gate driving circuit 110 can sequentially drive a plurality of gate lines GL by sequentially supplying gate signals to the display panel DP through the plurality of gate lines GL. Here, the gate driving circuit 110 is sometimes referred to as a scan driving circuit or a gate driving integrated circuit (GDIC).

The gate driving circuit 110 may include one or more gate driving integrated circuit (GDIC). The gate driving circuit 110 may be located on one side or two opposite sides of the display panel DP, such as, a left or right side, a top or bottom side, the left and right sides, or the top and bottom sides, according to a driving scheme. Further, the gate driving circuit 110 may be implemented in a gate-in-panel (GIP) type in which the gate driving circuit 120 is embedded in at least one bezel area of the display panel DP.

According to the control of the timing controller 140, the gate driving circuit 110 can sequentially supply gate signals with a turn-on voltage level or a turn-off voltage level to a plurality of gate lines GL. To do this, the gate driving circuit 110 may include a shift register, a level shifter, and the like.

The data driving circuit 120 can drive a plurality of data lines DL by receiving data voltages Vdata from the timing controller 140 and then providing the data signals to a plurality of data lines DL. Here, the data driving circuit 120 is sometimes referred to as a source driving circuit or a source driving integrated circuit (SDIC).

The data driving circuit 120 may include one or more source driving integrated circuit (SDIC). The source driving integrated circuit (SDIC) may be connected to a bonding pad of the display panel DP in a tape automated bonding (TAB) type or a chip on glass (COG) type, or directly disposed on the display panel DP. In some instances, one or more source driving integrated circuits (SDIC) may be integrated into the display panel DP. Each source driving integrated circuit (SDIC) may be implemented in a chip on film (COF) type. In this case, each source driving integrated circuit (SDIC) may be mounted on a circuit film, and be electrically connected to one or more data lines of the display panel DP through the circuit film.

When a specific gate line is turned on by the gate driving circuit 110, the data driving circuit 120 converts data voltages Vdata received from the timing controller 140 into image data voltages in the form of analog and supplies the resulted data voltages to a plurality of data lines DL.

The data driving circuit 120 may be located on, but not limited to, only one portion (e.g., an upper portion or a lower portion) of the display panel DP, or in some embodiments, be located on, but not limited to, two portions (e.g., the upper portion and the lower portion) of the display panel DP according to driving schemes, panel design schemes, or the like.

The data driving circuit 120 may include a shift register, a latch circuit, a digital to analog converter (DAC), an output buffer, and the like. The digital to analog converter (DAC) is used to convert data voltages Vdata received from the timing controller 140 to image data voltages in the form of analog in order to provide them to data lines DL.

The touch driving circuit 130 can sense the presence or absence of a touch on the display panel DP and a location of the touch. The touch driving circuit 130 may include a driving circuit generating a touch driving voltages to drive touch electrodes, and a sensing circuit sensing the touch electrodes and generating data for detecting information on the presence or absence of a touch and a touch coordinate. The driving circuit and the sensing circuit of the touch driving circuit 130 may be manufactured into a single integrated circuit called a read-out integrated circuit (ROIC), or be classified and separated into one or more portions based on their functions.

Meanwhile, the source driving integrated circuit (SDIC) implementing the data driving circuit 120 and the read-out integrated circuit (ROIC) implementing the touch driving circuit 130 may be manufactured into a combined integrated circuit (SRIC).

The touch driving circuit 130 may be formed on an external substrate connected to, or contacting, the display panel DP. The touch driving circuit 130 may be connected to the display panel DP through a plurality of sensing lines SL. The touch driving circuit 130 can sense the presence or absence of a touch and a touch location based on a difference in capacitance between touch electrodes formed on the display panel DP. That is, when a touch is performed, a difference in capacitance between a location that an conductive object, such a finger, an active or passive pen, or the like, contacts and a non-contact location occurs; in this situation, the touch driving circuit 130 can sense the presence or absence of a touch and a touch location by sensing such a difference in capacitance. The touch driving circuit 130 can generate a touch sensing signal for the presence or absence of a touch and a touch location and then provide the generated signal to the micro control unit 150.

The micro control unit 150 can control the touch driving circuit 130. The micro control unit 150 can receive a control synchronization signal Csync from the timing controller 140 and based on this, generate a touch synchronization signal Tsync for controlling the touch driving circuit 130. The micro control unit 150 can transmit or receive a touch sensing signal base on an interface IF defined between the touch driving circuit 130 and the micro control unit 150.

The micro control unit 150 may be implemented in the form of a touch control circuit in which the micro control unit 150 and the touch driving circuit 130 are integrated into a single integrated circuit, or implemented in the form of a control circuit in which the micro control unit 150 and the timing controller 140 are manufactured into a single integrated circuit.

Meanwhile, the touch display device may further include a memory. The memory can temporarily store data voltages Vdata provided from the timing controller 140 and output the data voltages Vdata to the data driving circuit 120 at a pre-configured timing. The memory may be disposed inside or outside of the data driving circuit 120, and when being disposed outside of the data driving circuit 120, the memory may be disposed between the timing controller 140 and the data driving circuit 120. Further, the memory may further include a buffer memory for storing data voltages Vdata received from the outside, and providing the stored data voltages Vdata to the timing controller 140.

In addition, the touch display device 100 may include an interface for transmitting one or more signals to, or receiving one or more signals from, one or more electronic devices or components located in the outside, or communications. The interface can be used to perform data communication, for example, via Serial Peripheral Interface (SPI), a Low-Voltage Differential Signaling (LVDS) interface, or Mobile Industry Processor Interface (MIPI).

In the above structure, the micro control unit 150 may be operated as a SPI master element, and the combined integrated circuit (SRIC) may be operated as an SPI slave element. The SPI is a synchronous type communication using four wires in series, and may be used for communication between the micro control unit 150 and at least one peripheral device, such as a sensor or a memory.

Figure 2:
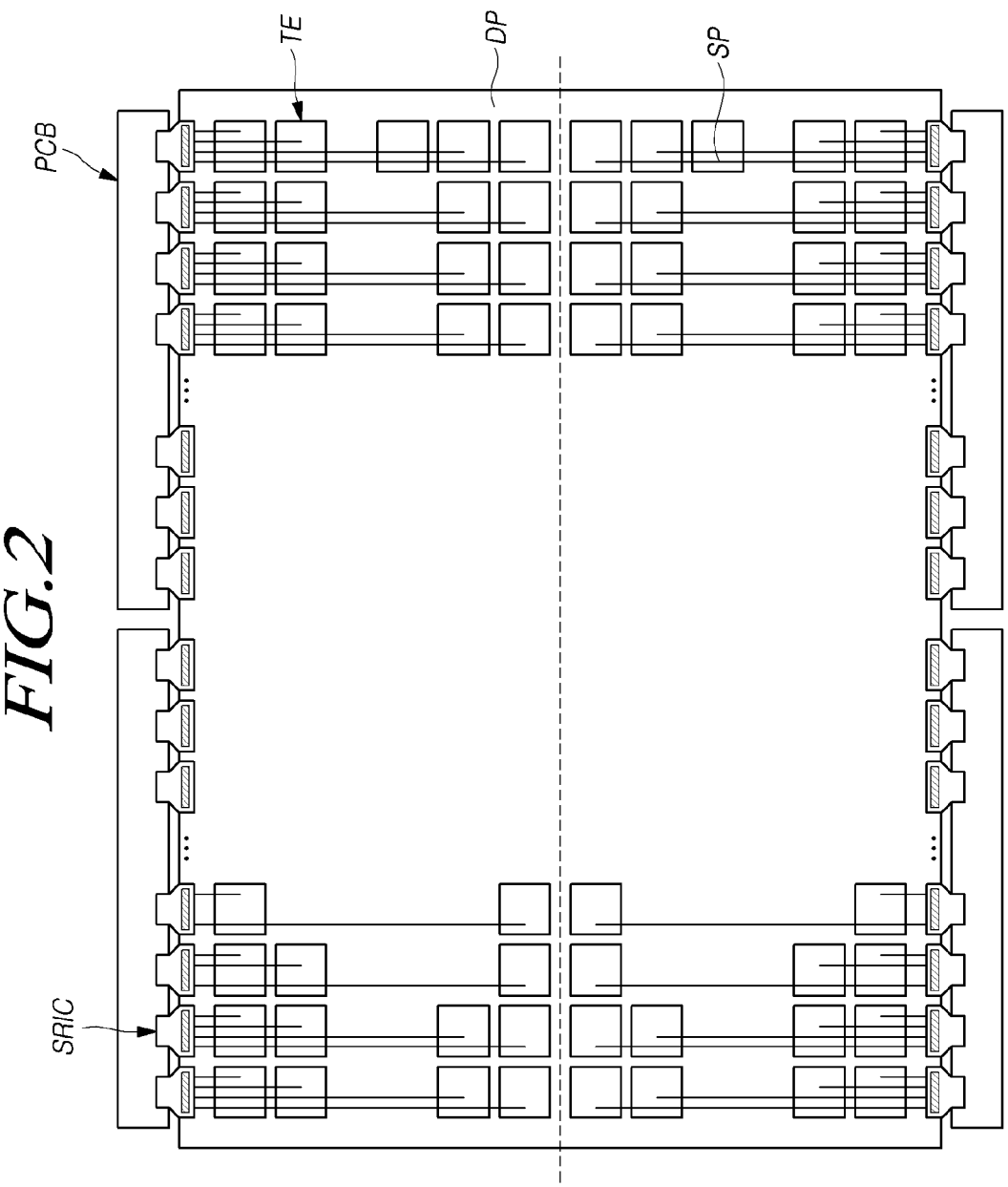
FIG. 2 illustrates a display panel of the touch display device according to embodiments of the present disclosure.

FIG. 2 illustrates a display panel of the touch display device according to embodiments of the present disclosure.

Referring to FIG. 2, the display panel DP of the touch display device 100 according to embodiments of the present disclosure may provide not only a function of displaying images, but also a function of sensing a touch from a passive stylus such as a finger, or the like and a function of sensing a pen touch (i.e. a function of recognizing a pen) from an active stylus.

The display panel DP may divide a common electrode used in a display period into a plurality of parts to use as a plurality of touch electrodes. Further, the plurality of touch electrodes resulted from the dividing of the common electrode may be used as touch-sensing-dedicated electrodes (i.e. touch-driving-dedicated electrodes).

The display panel DP may be a liquid crystal display panel, an organic light emitting display panel, or the like.

For example, when the display panel DP is the liquid crystal display panel, the touch display device 100 may divide a common electrode to which a common voltage is applied and which forms electric field with a pixel electrode into a plurality of parts, and use the divided parts as touch electrodes.

For another example, when the display panel DP is the organic light emitting display panel, the touch display device 100 may include an organic light emitting diode (OLED) including a first electrode, an organic light emitting layer, and a second electrode, an encapsulation layer located on the organic light emitting diode (OLED) and having an encapsulating function, and a touch sensor metal layer located on the encapsulation layer. Here, a plurality of touch electrodes may be formed on the touch sensor metal layer.

Hereinafter, for convenience of description and ease of understanding, it is assumed that a plurality of touch electrodes TE is used as touch driving electrodes (touch sensors) in the process of touch driving, and is used as a common electrode in the process of display driving.

The touch display device 100 may include a touch driving circuit 130 for performing touch sensing and pen touch sensing by using signals received through the display panel DP by driving the display panel DP.

Such a touch driving circuit 130 may include a read-out integrated circuit (ROIC) receiving signals through the display panel DP by driving the display panel DP, and a touch controller performing passive touch sensing (finger touch sensing) and active touch sensing by using signals received through the display panel DP.

Together with a source driving integrated circuit (SDIC) driving data lines DL, the read-out integrated circuit (ROIC) may be integrated into a combined integrated circuit SRIC.

The source driving integrated circuit (SDIC) may be implemented in a chip on film (COF) type in which it is mounted on a film, or a chip on glass (COG) type in which it is mounted on a glass substrate. Here, an example of the COF type is illustrated and discussed; however, embodiments of the present disclosure are not limited thereto. For example, the source driving integrated circuit (SDIC) may be implemented in the COG type.

The film or glass on which the source driving integrated circuit (SDIC) is mounted may be coupled to both or any one of a bonding portion of the display panel DP and a bonding portion of a printed circuit board (PCB).

The touch controller etc. may be mounted on the printed circuit board (PCB).

The read-out integrated circuit (ROIC) and the source driving integrated circuit (SDIC) may be implemented in respective driving chips.

The combined integrated circuit SRIC may be electrically connected to a plurality of touch electrodes TE included in the display panel DP through a plurality of signal lines.

At this time, the combined integrated circuit SRIC may perform touch sensing during a touch period separated from a display period in time. In another example, the touch period in which the touch sensing is performed, and the display period may be overlapped in time, and in this case, the touch period may have a time period equal to, or different from, the display period.

In such a touch display device 100, a plurality of combined integrated circuits SRIC connected to the display panel DP can determine the presence or absence of a touch based on a touch sensing control signal provided from a micro control unit 150. In this case, it is necessary to provide the touch sensing control signal to the combined integrated circuits SRIC to determine the presence or absence of a touch even when the touch display device 100 is operated in a low power mode; therefore, power consumption may increase in the low power mode.

In accordance with embodiments of the present disclosure, provided is a touch display device 100 capable of reducing power consumption caused by the micro control unit 150 by allowing one or more of a plurality of combined integrated circuits SRIC connected to a display panel DP to generate a touch sensing control signal and the generated signal to be provided to one or more remaining combined integrated circuits.

Figure 3:
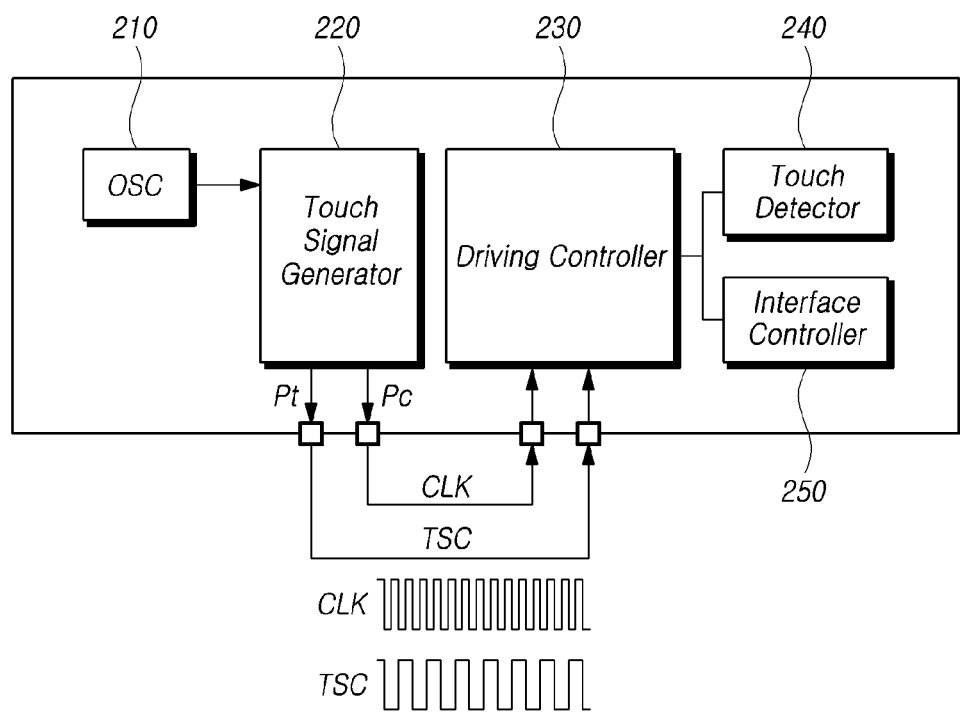
FIG. 3 is a block diagram illustrating an example of a combined integrated circuit capable of generating a touch sensing control signal in the touch display device according to embodiments of the present disclosure.

FIG. 3 is a block diagram illustrating an example of a combined integrated circuit capable of generating a touch sensing control signal in the touch display device according to embodiments of the present disclosure.

Referring to FIG. 3, in the touch display device 100 according to embodiments of the present disclosure, a plurality of combined integrated circuits (SRIC-1, . . . , SRIC-N) may be classified into at least one master combined integrated circuit 200 generating a clock signal CLK and a touch sensing control signal TSC and internally using the generated signals, and one or more slave combined integrated circuits receiving and using the clock signal CLK and the touch sensing control signal TSC generated from the master combined integrated circuit 200.

In another example, all combined integrated circuits (SRIC-1, . . . , SRIC-N) may be implemented as master combined integrated circuits 200, and in this situation, only one selected master combined integrated circuit 200 may generate a clock signal CLK and a touch sensing control signal TSC and provide the generated signals to the remaining combined integrated circuits.

By allowing all combined integrated circuits (SRIC-1, . . . , SRIC-N) to generate the clock signal CLK and the touch sensing control signal TSC, the combined integrated circuits SRIC used in the touch display device 100 may be manufactured in a single process and used in common. Like this, it may be desirable to allow one or more combined integrated circuits selected when needed to serve as a master combined integrated circuit 200 in a situation where all combined integrated circuits (SRIC-1, . . . , SRIC-N) are allowed to serve as the master combined integrated circuit 200.

One or more of the plurality of combined integrated circuits (SRIC-1, . . . , SRIC-N) connected to the display panel DP may become the master combined integrated circuit 200.

When one or more of all combined integrated circuits (SRIC-1, . . . , SRIC-N) is set as the master combined integrated circuit 200, a combined integrated circuit is set in a location closest to the micro control unit 150 as the master combined integrated circuit 200 for an efficient connection with the micro control unit 150.

The master combined integrated circuit 200 capable of generating a touch sensing control signal TSC may include an oscillator (OSC) 210, a touch signal generator 220, a driving controller 230, a touch detector 240, and an interface controller 250.

The oscillator 210 can generate a signal in the form of a pulse that can be transitioned to a pulse of a certain frequency.

The touch signal generator 220 can generate a clock signal CLK and a touch sensing control signal TSC for touch sensing used to drive all combined integrated circuits (SRIC-1, ..., SRIC-N) using the pulse signal generated from the oscillator 210.

The touch sensing control signal TSC generated by touch signal generator 220 based on the pulse signal generated from the oscillator 210 may include a touch synchronization signal Tsync, such as a beacon signal or a ping signal, or a touch driving signal.

The clock signal CLK and the touch sensing control signal TSC generated by touch signal generator 220 may be output to the outside through a clock signal output pin Pc and a touch sensing control signal output pin Pt, respectively, and be provided to the driving controller 230 of the master combined integrated circuit 200 through a feedback loop or to other combined integrated circuits SRIC.

The clock signal CLK and the touch sensing control signal TSC generated by the touch signal generator 220 are fed back to the driving controller 230, and the driving controller 230 can drive the master combined integrated circuit 200 using the feedback signals. That is, the master combined integrated circuit 200 does not receive, from the micro control unit 150, the clock signal CLK and the touch sensing control signal TSC, and instead, directly use the signals generated by the internal touch signal generator 220.

Accordingly, it is not necessary for the micro control unit 150 continually to provide a clock signal CLK and a touch sensing control signal TSC to the plurality of combined integrated circuits (SRIC-1, ..., SRIC-N), and in particular, in the low power mode, power consumption caused by the micro control unit 150 can be reduced by allowing the master combined integrated circuit 200 to generate the clock signal CLK and the touch sensing control signal TSC and provide the generated signals to all combined integrated circuits (SRIC-1, ..., SRIC-N).

According to this, the touch detector 240 connected to the driving controller 230 can sense a touch on the display panel DP based on the clock signal CLK and the touch sensing control signal TSC generated by the touch signal generator 220.

The touch detector 240 can determine the presence or absence of a touch using a variety of methods, for example, a method of comparing between touch sensing signals received during a predetermined time period, a method of comparing an average value of touch sensing signals received during a predetermined time period with each touch sensing signal, a method of comparing a touch sensing signal with a reference value stored in a memory, or the like.

The touch detector 240 can determine the presence or absence of a touch based on at least one touch sensing signal received from the display panel DP, and when it is determined that the touch has been performed, provide a touch presence signal indicating that the touch has been performed through the interface controller 250 to the micro control unit 150.

Accordingly, in order to determine the presence or absence of a touch on the display panel DP, the master combined integrated circuit 200 does not need to provide a touch sensing signal to the micro control unit 150 every time, and is needed to provide the touch sensing signal to the micro control unit 150 only when the master combined integrated circuit 200 determines that a touch has been performed; therefore, it is possible to reduce power consumption caused by providing the touch sensing signal.

Figure 4:
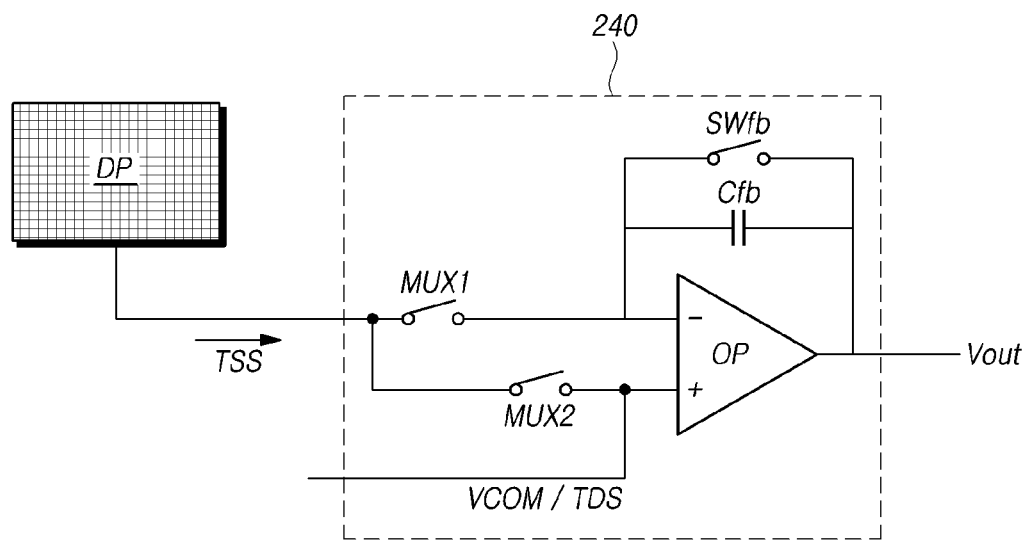
FIG. 4 illustrates an example of a touch detector in the touch display device according to embodiments of the present disclosure.

FIG. 4 illustrates an example of a touch detector in the touch display device according to embodiments of the present disclosure.

Referring to FIG. 4, in touch display device 100 according to embodiments of the present disclosure, a plurality of touch channels respectively are connected to a plurality of touch electrodes arranged on the display panel DP. Here, each touch electrode TE can serve as a touch sensor providing a touch sensing signal TSS generated by a touch pressure put on the display panel DP to the touch detector 240 through the touch channel, and serve as a common electrode.

A combined integrated circuit SRIC may include a plurality of touch detectors 240 receiving touch sensing signals TSS from the display panel DP through the plurality of touch channels, and the plurality of touch detectors 240 respectively are connected to the plurality of touch channels and receive a self-capacitance signal or a mutual-capacitance signal as the touch sensing signal TSS.

At this time, a touch detector 240 may be connected to both a first touch channel to which the touch detector 240 is connected and a second touch channel adjacent to the first touch channel, and in this case, the touch detector 240 may differentially receive a first touch sensing signal input from the first touch channel and a second touch sensing signal input from the second touch channel. The touch detector 240 can generate a touch signal output voltage Vout of a certain bit by detecting a change in capacitance of a touch electrode TE.

A touch detector 240 connected to a specific touch channel in the combined integrated circuit SRIC may include an operational amplifier OP, and a first multiplexer MUX1 connected between an inverting input terminal (−) and the display panel DP and providing a touch sensing signal TSS, and a second multiplexer MUX2 connected between a non-inverting input terminal (+) and the display panel DP and providing a common voltage VCOM.

In a display driving period Td, the first multiplexer MUX1 of the touch detector 240 becomes turned off, and the second multiplexer MUX2 becomes turned on, and a common voltage VCOM is applied to the non-inverting input terminal (+) of the operational amplifier OP. Accordingly, the common voltage VCOM is applied to touch electrodes TE arranged in the display panel DP, and in turn, electric field can be formed between pixels and touch electrodes TE, and as a result, display images can be presented on the display panel DP.

In a touch sensing period Tt, the first multiplexer MUX1 of the touch detector 240 becomes turned on, and the second multiplexer MUX2 becomes turned off, and a touch driving signal TDS is applied to the inverting input terminal (−) of the operational amplifier OP. Accordingly, the touch driving signal TDS is applied to touch electrodes TE arranged in the display panel DP, and thus, a change in capacitance of the touch electrodes can be sensed through a feedback capacitor Cfb.

The feedback capacitor Cfb and a feedback switch SWfb are connected in parallel between the inverting input terminal (−) and the output terminal of the operational amplifier OP, and a touch sensing output voltage Vout of the operational amplifier OP may be accumulated a predetermined number of times and provided to the micro control unit 150.

Here, when the feedback switch SWfb is turned on, a voltage charged in the feedback capacitor Cfb is reset; therefore, the feedback switch SWfb also serves as a reset switch.

The first multiplexer MUX1 and the second multiplexer MUX2 correspond to switches for providing the touch sensing signal TSS and the common voltage VCOM respectively, according to respective control signals.

In the touch detector 240, by allowing an inverter to be located between the first multiplexer MUX1 connected to the inverting input terminal (−) of the operational amplifier OP and the second multiplexer MUX2 connected to the non-inverting input terminal (+) thereof, when the first multiplexer MUX1 becomes turned on, the second multiplexer MUX2 may be configured to be automatically turned off.

In another example, when the first multiplexer MUX1 becomes turned off, and the second multiplexer MUX2 connected to the non-inverting input terminal (+) becomes turned on, a common voltage VCOM can be applied to the display panel DP.

Here, the first multiplexer MUX1 and the second multiplexer MUX2 connected to the touch detector 240 may be included in one block, and according to configurations of pixels arranged in the display panel DP, may be connected to the display panel DP on a block basis.

Figure 5:
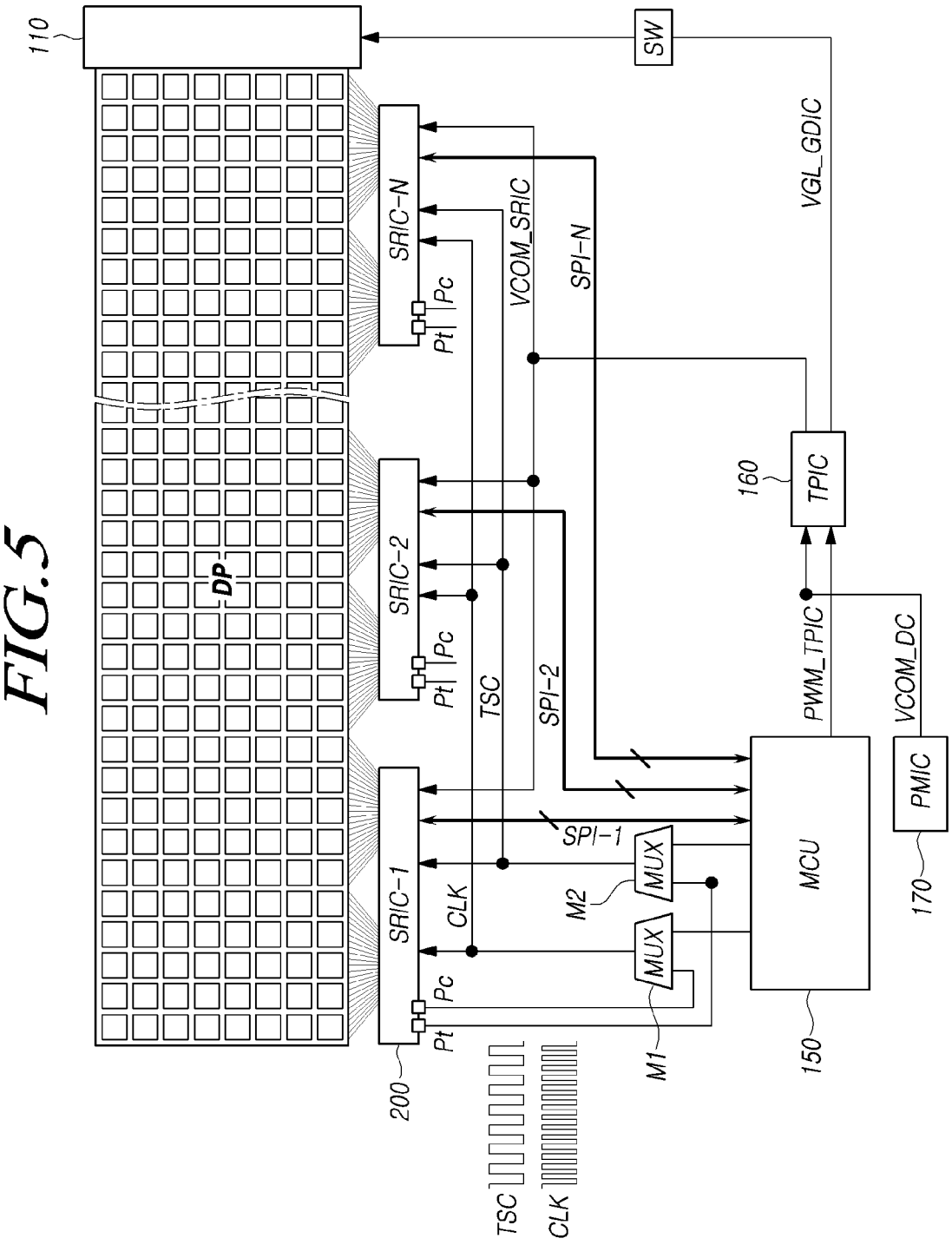
FIG. 5 illustrates a configuration of the touch display device according to embodiments of the present disclosure.

FIG. 5 illustrates a configuration of the touch display device according to embodiments of the present disclosure.

Referring to FIG. 5, in the touch display device 100 according to embodiments of the present disclosure, a touch driving circuit 130 applying a touch driving signal TDS to a display panel DP and performing touch sensing based on sensing signals received from the display panel DP is implemented as a read-out IC ROIC, and a plurality of combined integrated circuits (SRIC-1, . . . , SRIC-N), in each of which a source driving integrated circuit (SDIC) driving data lines DL and the read-out integrated circuit (ROIC) are combined, are arranged.

The combined integrated circuits (SRIC-1, . . . , SRIC-N) herein may mean a touch driving circuit 130 or an integrated circuit in which the touch driving circuit 130 and one or more other driving circuits are combined. Accordingly, a circuit including the combined integrated circuits (SRIC-1, . . . , SRIC-N) may be referred to as a touch driving circuit.

The touch display device 100 according to embodiments of the present disclosure can generate a clock signal CLK and a touch sensing control signal TSC, and provide the generated signals to all combined integrated circuits (SRIC-1, . . . , SRIC-N) through a clock signal pin Pc and a touch sensing control signal output pin Pt, by configuring at least one of the combined integrated circuits (SRIC-1, . . . , SRIC-N) as a master combined integrated circuit 200.

Here, the clock signal CLK and the touch sensing control signal TSC may also be able to be generated by other combined integrated circuits (SRIC-2, . . . , SRIC-N) except for the master combined integrated circuit 200; here, illustrated is an embodiment where a clock signal CLK and a touch sensing control signal TSC generated from a single combined integrated circuit SRIC-1 selected as a master combined integrated circuit 200 are provided to all combined integrated circuits (SRIC-1, . . . , SRIC-N).

The clock signal CLK output from the master combined integrated circuit 200 and a clock signal CLK output from a micro control unit 150 may be provided to the combined integrated circuits (SRIC-1, . . . , SRIC-N) through a first multiplexer M1.

The touch sensing control signal TSC output from the master combined integrated circuit 200 and a touch sensing control signal TSC output from the micro control unit 150 may be selectively provided to the combined integrated circuits (SRIC-1, . . . , SRIC-N) through a second multiplexer M2.

According to this, the clock signal CLK and the touch sensing control signal TSC generated from the master combined integrated circuit 200 may be used to drive the combined integrated circuits (SRIC-1, . . . , SRIC-N) in one or more operation mode(s) of the touch display device 100, for example, a low power mode such as a sleep mode. In another example, in a normal mode other than the low power mode, the clock signal CLK and the touch sensing control signal TSC generated from the micro control unit 150 may be provided to the combined integrated circuits (SRIC-1, . . . , SRIC-N)).

A switch SW may be disposed between a touch power integrated circuit 160 and a gate driving circuit 110, and by controlling the operation of the switch SW, a driving-used gate low voltage VGL_GDIC generated from the touch power integrated circuit 160 can be prevented from being provided to the gate driving circuit 110 in the low power mode.

Here, the first and second multiplexers M1 and M2 located between the master combined integrated circuit 200 and the micro control unit 150 may be controlled so that the clock signal CLK and the touch sensing control signal TSC generated from the master combined integrated circuit 200 can be provided to all combined integrated circuits (SRIC-1, . . . , SRIC-N) at a time identical to a time at which the switch SW is blocked.

Here, the plurality of combined integrated circuits (SRIC-1, . . . , SRIC-N) can receive the clock signal CLK and the touch sensing control signal TSC from the master combined integrated circuit 200, in the low power mode, and can present images on the display panel DP or perform touch sensing using the driving-used gate low voltage VGL_GDIC and a driving-used common voltage VCOM_SRIC provided from the touch power integrated circuit 160.

Using a DC common voltage VCOM_DC and a DC gate low voltage VGL_DC applied from a power management integrated circuit 170, the touch power integrated circuit 160 can generate the driving-used common voltage VCOM_SRIC applied to the plurality of combined integrated circuits (SRIC-1, . . . , SRIC-N) and the driving-used gate low voltage VGL_GDIC applied to the gate driving IC 110 in a display driving period and a touch sensing period.

Here, the micro control unit 150, the touch power integrated circuit 160 and the power management integrated circuit 170 may be mounted on a control printed circuit board (CPCB).

The control printed circuit board (CPCB) may be electrically connected to a source printed circuit board (SPCB) via a cable, and the source printed circuit board (SPCB) and the display panel DP may be electrically connected to each other, for example, in a COF type. When the display panel DP has a small size, the source printed circuit board (SPCB) and the control printed circuit board (CPCB) may be combined to form a single body.

Accordingly, in the normal mode, the micro control unit 150 can cause the transmission or reception of interface signals (SPI-1, . . . , SPI-N) while providing a clock signal CLK and a touch sensing control signal TSC to the plurality of combined integrated circuits (SRIC-1, . . . , SRIC-N). In another example, in the low power mode, a clock signal CLK and a touch sensing control signal TSC generated from the master combined integrated circuit 200 are provided to the plurality of combined integrated circuits (SRIC-1, . . . , SRIC-N).

Meanwhile, since a load-free common voltage VCOM_LFD provided from the touch power integrated circuit 160 to the combined integrated circuits (SRIC-1, . . . , SRIC-N) has a magnitude and an amplitude identical to a touch driving signal TDS, the touch sensing control signal TSC generated from the master combined integrated circuit 200 may be used as the load-free common voltage VCOM_LFD provided to the combined integrated circuits (SRIC-1, . . . , SRIC-N).

Figure 6:
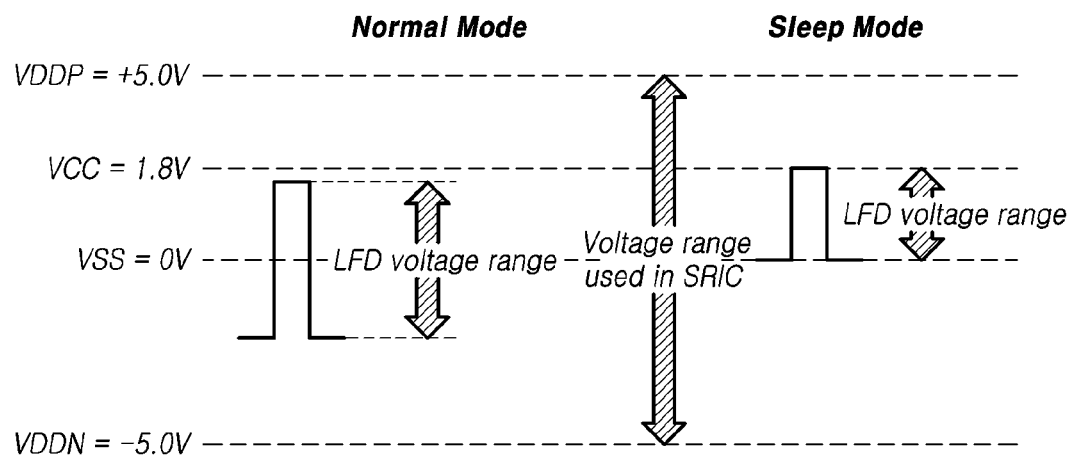
FIG. 6 illustrates an example of a load-free driving signal according to an operation mode in the touch display device according to embodiments of the present disclosure.

FIG. 6 illustrates an example of a load-free driving signal according to an operation mode in the touch display device according to embodiments of the present disclosure.

Referring to FIG. 6, touch display device 100 according to embodiments of the present disclosure can use a common electrode for driving one or more sub-pixels SP as a sensor for touch sensing. Accordingly, during the display driving period, a driving-used common voltage VCOM_SRIC is provided to a thin film transistor, and during the touch sensing period, a touch driving signal TDS is provided to common electrode (CE) acting as touch electrode TE.

Here, a parasitic capacitance may be formed between the touch electrode TE and the sub-pixel SP due to capacitive coupling, and to reduce such a resulted influence, one frame period may be divided into, in time, a display driving period for driving one or more sub-pixels SP and a touch sensing period for driving one or more touch electrodes.

In particular, as a parasitic capacitance between the touch electrode TE and the sub-pixel SP becomes greater, touch sensitivity and accuracy of touch detection may be lowered; therefore, to reduce this influence, a load-free driving (LFD) scheme may be implemented.

The load-free driving is a scheme for reducing the influence of a parasitic capacitance caused by one or more touch electrodes on a result of touch sensing during the touch sensing period Tt by providing an AC signal with phase and amplitude identical to the touch driving signal TDS to one or more data lines and/or one or more gate lines of the display panel DP.

The load-free driving is performed such that while providing data voltages Vdata of input image signals to the data lines DL, gate pulses including a gate high voltage VGH_DC and a gate low voltage VGL_LFD are provided to the gate lines GL during the display driving period Td, and a load-free common voltage VCOM_LFD and a load-free gate low voltage which are in sync with a touch driving signal TDS are provided to one or more data lines and one or more gate lines, respectively, during the touch sensing period Tt.

When the load-free driving is implemented, since an AC signal with phase and amplitude identical to the touch driving signal TDS is applied to both terminals through which parasitic capacitance is formed, it is possible to reduce the influence of the parasitic capacitance. This is because a voltage between both terminals through which the parasitic capacitance is formed concurrently varies, and the smaller a difference in the voltage, the smaller an amount of electric charges charged by the parasitic capacitance is. When the load-free driving is implemented, theoretically, since the amount of electric charges charged by the parasitic capacitance becomes 0, it is possible to obtain a load-free effect such as no parasitic capacitance.

Here, the load-free driving signal may be determined within a range of a driving voltage VDD used in one or more combined integrated circuits SRIC.

For example, when a driving voltage VDD used in one or more combined integrated circuits SRIC is in a range of +5.0V to −5.0V, a load-free driving signal in the normal mode may have a value of +1.5V to −1.5V, and in this case, the load-free driving signal has a width (peak to peak) of 3V.

Further, while a width of a load-free driving signal used in the low power mode has a value smaller than that of the load-free driving signal in the normal mode, the load-free driving signal used in the low power mode may be determined based on a logic voltage VCC of a driving controller 230 used in the master combined integrated circuit 200.

FIG. 7 illustrates a configuration of a touch display device according to another embodiment of the present disclosure.

Referring to FIG. 7, in a touch display device 100 according to another embodiment of the present disclosure, a touch driving circuit 130 applying a touch driving signal TDS to a display panel DP and performing touch sensing based on sensing signals received from the display panel DP is implemented as a read-out integrated circuit (ROIC), and a plurality of combined integrated circuits (SRIC-1, . . . , SRIC-N), in each of which a source driving integrated circuit (SDIC) driving data lines DL and the read-out integrated circuit (ROIC) are integrated, are arranged.

The touch display device 100 can generate a clock signal CLK and a touch sensing control signal TSC, and provide the generated signals to all combined integrated circuits (SRIC-1, . . . , SRIC-N) through a clock signal pin Pc and a touch sensing control signal output pin Pt, by configuring at least one of the combined integrated circuits (SRIC-1, . . . , SRIC-N) as a master combined integrated circuit 200.

Here, the clock signal CLK and the touch sensing control signal TSC may also be able to be generated by other combined integrated circuits (SRIC-2, . . . , SRIC-N) except for the master combined integrated circuit 200; here, illustrated is an embodiment where a clock signal CLK and a touch sensing control signal TSC generated from a single combined integrated circuit SRIC-1 selected as a master combined integrated circuit 200 are provided to all combined integrated circuits (SRIC-1, . . . , SRIC-N).

Here, the clock signal CLK and the touch sensing control signal TSC output from the master combined integrated circuit 200 and a clock signal CLK and a touch sensing control signal TSC output from a micro control unit 150 may be provided to all combined integrated circuits (SRIC-1, . . . , SRIC-N) through a first multiplexer M1 and a second multiplexer M2, respectively.

According to this, while in the low power mode, the clock signal CLK and the touch sensing control signal TSC generated from the master combined integrated circuit 200 may be used to drive all combined integrated circuits (SRIC-1, . . . , SRIC-N), the clock signal CLK and the touch sensing control signal TSC generated from the micro control unit 150 may be provided to the combined integrated circuits (SRIC-1, . . . , SRIC-N) in the normal mode.

A switch SW may be disposed between a touch power integrated circuit 160 and a gate driving circuit 110, and by controlling the operation of the switch SW, a driving-used gate low voltage VGL_GDIC generated from the touch power integrated circuit 160 can be prevented from being provided to the gate driving circuit 110 in the low power mode.

At this time, since a load-free common voltage VCOM_LFD provided from the touch power integrated circuit 160 to the combined integrated circuits (SRIC-1, . . . , SRIC-N) has a magnitude and an amplitude identical to a touch driving signal TDS, the touch sensing control signal TSC generated from the master combined integrated circuit 200 may be used as the load-free common voltage VCOM_LFD provided to the combined integrated circuits (SRIC-1, . . . , SRIC-N).

Accordingly, while the master combined integrated circuit 200 provides the touch sensing control signal TSC to the plurality of combined integrated circuits (SRIC-1, . . . , SRIC-N) during a touch sensing period Tt, the master combined integrated circuit 200 can provide a load-free common voltage VCOM_LFD with a magnitude and an amplitude identical to the touch sensing control signal TSC to the combined integrated circuits (SRIC-1, . . . , SRIC-N).

To do this, the touch sensing control signal TSC generated from the master combined integrated circuit 200, that is, the load-free common voltage VCOM_LFD, is provided to a third multiplexer M3, together with a DC common voltage VCOM_DC generated from a power management integrated circuit 170. Here, taking account of a delivering time of the load-free common voltage VCOM_LFD, one or more buffers Buf may be disposed between the master combined integrated circuit 200 and the third multiplexer M3.

Meanwhile, when in the normal mode, the clock signal CLK and the touch sensing control signal TSC generated from the micro control unit 150 may be provided to the combined integrated circuits (SRIC-1, . . . , SRIC-N), and in the low power mode, the clock signal CLK and the touch sensing control signal TSC generated from the master combined integrated circuit 200 may be provided to the combined integrated circuits (SRIC-1, . . . , SRIC-N), since respective load-free common voltages in the normal mode and the low power mode may be different, in order to allow a load-free common voltage VCOM_LFD to be selected according to an operation mode, a fourth multiplexer M4 may be further disposed between the third multiplexer M3 and the plurality of combined integrated circuits (SRIC-1, . . . , SRIC-N).

As described above, in touch display device 100 according to embodiments of the present disclosure, by allowing a master combined integrated circuit 200 to generate a clock signal CLK and a touch sensing control signal TSC and provide the generated signals to a plurality of combined integrated circuits (SRIC-1, . . . , SRIC-N), it is possible to reduce the functionality of the micro control unit 150 and reduce power consumption. Further, by allowing the touch sensing control signal TSC generated from the master combined integrated circuit 200 to be used as a load-free common voltage VCOM_LFD, it is possible to reduce power consumption of a touch power integrated circuit 160.

In particular, in touch display device 100 according to embodiments of the present disclosure, by allowing all combined integrated circuits (SRIC-1, . . . , SRIC-N) to be able generate a clock signal CLK and a touch sensing control signal TSC, the combined integrated circuits SRIC used in the touch display device 100 may be manufactured in a single process and used in common. Like this, one or more combined integrated circuits may be selected as a master combined integrated circuit 200 when needed in a situation where all combined integrated circuits (SRIC-1, . . . , SRIC-N) may be allowed to serve as the master combined integrated circuit 200.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present invention. The above description and the accompanying drawings provide an example of the technical idea of the present invention for illustrative purposes only. That is, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A touch display device comprising:
   a display panel including a plurality of touch electrodes, the display panel configured to switch between a first mode and a second mode that is different from the first mode;
   a gate driving circuit configured to provide gate signals to a plurality of gate lines;
   a first combined integrated circuit and a second combined integrated circuit configured to provide data voltages to a plurality of data lines, wherein the first combined integrated circuit is configured to generate a first clock signal and a first touch sensing control signal that are provided to the second combined integrated circuit during the first mode but not the second mode;
   a micro control unit configured to generate a second clock signal and a second touch sensing control signal that are provided to the first combined integrated circuit and the second combined integrated circuit during the second mode but not the first mode;
   wherein the first combined integrated circuit and the second combined integrated circuit are configured to provide at least one touch driving signal to the display panel and configured to sense a touch based on at least one touch sensing signal received in response to the at least one touch driving signal according to the first clock signal and the first touch sensing control signal provided by the first combined integrated circuit during the first mode, and
   wherein the first combined integrated circuit and the second combined integrated circuit are configured to provide at least one touch driving signal to the display panel and configured to sense a touch based on at least one touch sensing signal received in response to the at least one touch driving signal according to the second clock signal and the second touch sensing control signal provided by the micro control unit during the second mode.

2. The touch display device according to claim 1, wherein the first combined integrated circuit and the second combined integrated circuit each includes a clock signal output pin and a touch sensing control signal output pin, and the first touch sensing control signal includes a touch synchronization signal or a touch driving signal.

3. The touch display device according to claim 1, further comprising:
   a first multiplexer configured to select the first clock signal to provide to the first combined integrated circuit and the second combined integrated circuit during the first mode, and select the second clock signal to provide to the first combined integrated circuit and the second combined integrated circuit during the second mode;
   a second multiplexer configured to select the first touch sensing control signal to provide to the first combined integrated circuit and the second combined integrated circuit during the first mode, and select the second touch sensing control signal to provide to the first combined integrated circuit and the second combined integrated circuit during the second mode.

4. The touch display device according to claim 1, wherein the first mode is a low power mode of the touch display device and the second mode is a normal mode of the touch display device.

5. The touch display device according to claim 1, wherein the first combined integrated circuit is disposed at a location closer to the micro control unit than the second combined integrated circuit.

6. The touch display device according to claim 1, wherein at least one of the first combined integrated circuit and the second combined integrated circuit comprises:
- an oscillator configured to generate a pulse signal of a predetermined frequency;
- a touch signal generator configured to generate the first clock signal and the first touch sensing control signal using the pulse signal;
- a touch detector configured to sense a touch based on the at least one touch sensing signal provided from the display panel;
- an interface controller configured to output a result from the touch sensing; and
- a driving controller configured to control touch sensing operations of the touch detector and the interface controller according to the first clock signal and the first touch sensing control signal.

7. The touch display device according to claim 6, wherein the touch detector determines presence or absence of a touch by comparing touch sensing signals received during a predetermined time period, comparing an average value of the touch sensing signals received during the predetermined time period with each touch sensing signal, or comparing the at least one touch sensing signal with a reference value stored in a memory.

8. The touch display device according to claim 1, further comprising:
- a touch power integrated circuit configured to generate an alternating current (AC) signal applied to the plurality of touch electrodes through the first combined integrated circuit and the second combined integrated circuit during a touch sensing period; and
- a multiplexer configured to select one of the first touch sensing control signal generated from the first combined integrated circuit and the AC signal generated from the touch power integrated circuit according to the first mode or the second mode of the touch display device, and providing the selected signal to the first combined integrated circuit or the second combined integrated circuit.

9. The touch display device according to claim 8, further comprising one or more buffers disposed between the first combined integrated circuit and the multiplexer.

10. The touch display device according to claim 8, further comprising a switch disposed between the touch power integrated circuit and the gate driving circuit, and configured to control a gate low voltage applied to the gate driving circuit according to an operation mode.

11. The touch display device according to claim 1, wherein the first clock signal and the first touch sensing control signal are provided to the first combined integrated circuit during the first mode of the touch display device.

12. A driving circuit of a touch display device comprising a first combined integrated circuit and a second combined integrated circuit providing data voltages, and the first combined integrated circuit and the second combined integrated circuit for providing at least one touch driving signal to the display panel and sensing a touch based on at least one touch sensing signal received in response to the at least one touch driving signal, the first combined integrated circuit comprises:
- an oscillator configured to generate a pulse signal of a predetermined frequency;
- a touch signal generator configured to generate a first clock signal and a first touch sensing control signal using the pulse signal;
- a touch detector configured to sense a touch based on the at least one first touch sensing signal provided from the display panel;
- an interface controller configured to output a result from the touch sensing; and
- a driving controller configured to control touch sensing operations of the touch detector and the interface controller according to the first clock signal and the first touch sensing control signal.

13. The driving circuit of the touch display device according to claim 12, further comprising:
- a micro control unit configured to provide a second clock signal and a second touch sensing control signal to the first combined integrated circuit and the second combined integrated circuit; and
- a multiplexer configured to select one clock signal and one touch sensing control signal to be provided to the first combined integrated circuit and the second combined integrated circuit generated from the first combined integrated circuit and the micro control unit according to an operation mode.

14. The driving circuit of the touch display device according to claim 13, wherein the multiplexer selects the second clock signal and the second touch sensing control signal to be provided to the first combined integrated circuit and the second combined integrated circuit generated from the micro control unit in a normal mode, and selects the first clock signal and the first touch sensing control signal to be provided to the first combined integrated circuit and the second combined integrated circuit generated from the first combined integrated circuit in a low power mode.

15. The driving circuit of the touch display device according to claim 13, wherein the first combined integrated circuit is disposed at a location closer to the micro control unit than the second combined integrated circuit.

16. The driving circuit of the touch display device according to claim 12, wherein the touch detector determines presence or absence of a touch by comparing touch sensing signals received during a predetermined time period, comparing an average value of the touch sensing signals received during the predetermined time period with each touch sensing signal, or comparing the at least one touch sensing signal with a reference value stored in a memory.

17. The driving circuit of the touch display device according to claim 12, further comprising:
- a touch power integrated circuit configured to generate an alternating current (AC) signal applied to a plurality of touch electrodes through the first combined integrated circuit and the second combined integrated circuit during a touch sensing period; and
- a multiplexer configured to select one of the first touch sensing control signal generated from the first combined integrated circuit and the AC signal generated from the touch power integrated circuit according to an operation mode, and providing the selected signal to the first combined integrated circuit and the second combined integrated circuit.

18. The driving circuit of the touch display device according to claim 17, further comprising one or more buffers disposed between the first combined integrated circuit and the multiplexer.

19. The driving circuit of the touch display device according to claim 17, further comprising a switch disposed between the touch power integrated circuit and a gate driving circuit providing gate signals to a display panel, and configured to control a gate low voltage applied to the gate driving circuit according to an operation mode.

20. The driving circuit according to claim 12, wherein the first combined integrated circuit and the second combined integrated circuit each includes a clock signal output pin and a touch sensing control signal output pin, and the first touch sensing control signal includes a touch synchronization signal or a touch driving signal.

21. A method of driving a touch display device configured to switch between a first mode and a second mode that is different from the first mode and comprising a gate driving circuit providing gate signals to a display panel including a plurality of touch electrodes, a first combined integrated circuit and a second combined integrated circuit providing data voltages, and the first combined integrated circuit and the second combined integrated circuit for providing at least one touch driving signal to the display panel and sensing a touch based on at least one touch sensing signal received in response to the at least one touch driving signal, the method comprising:

generating a first clock signal and a first touch sensing control signal in the first combined integrated circuit during the first mode but not the second mode;

generating a second clock signal and a second touch sensing control signal in a micro control unit during the second mode but not the first mode; and providing the first clock signal and the first touch sensing control signal generated by the first combined integrated circuit to the second combined integrated circuit during the first mode, and providing the second clock signal and the second touch sensing control signal generated by the micro control unit to the first combined integrated circuit and the second combined integrated circuit during the second mode.

22. The method according to claim 21, further comprising determining presence or absence of a touch by comparing touch sensing signals received during a predetermined time period, comparing an average value of the touch sensing signals received during the predetermined time period with each touch sensing signal, or comparing the at least one touch sensing signal with a reference value stored in a memory.

23. The method according to claim 21, further comprising:

generating an alternating current (AC) signal applied to the plurality of touch electrodes through the first combined integrated circuit and the second combined integrated circuit by a touch power integrated circuit during a touch sensing period; and selecting one of the first touch sensing control signal generated by the first combined integrated circuit and the AC signal generated by the touch power integrated circuit according to the first mode or the second mode, and providing the selected signal to the first combined integrated circuit and the second combined integrated circuit.

24. The method according to claim 23, further comprising controlling a gate low voltage applied to the gate driving circuit according to an operation mode through a switch disposed between the touch power integrated circuit and the gate driving circuit.

25. The method according to claim 21, wherein the first clock signal and the first touch sensing control signal are provided to the first combined integrated circuits during the first mode of the touch display device.

\* \* \* \* \*